(12) United States Patent
Gross

(10) Patent No.: US 6,294,288 B1
(45) Date of Patent: Sep. 25, 2001

(54) BATTERY CELL HAVING NOTCHED LAYERS

(75) Inventor: Oliver J. Gross, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 0 days.

(21) Appl. No.: 09/451,901

(22) Filed: Dec. 1, 1999

(51) Int. Cl.⁷ .................................................. H01M 6/46
(52) U.S. Cl. ........................ 429/153; 429/127; 429/162
(58) Field of Search ................................... 429/162, 153, 429/127, 152, 160

(56) References Cited

U.S. PATENT DOCUMENTS

| 5,460,904 | 10/1995 | Gozdz et al. . |
| 5,587,253 | 12/1996 | Gozdz et al. . |
| 6,030,721 | * 2/2000 | Lake . |

FOREIGN PATENT DOCUMENTS

| 4-332462 | 11/1992 | (JP) . |
| 5-234598 | 9/1993 | (JP) . |
| 6-260172 | 9/1994 | (JP) . |
| 10-270014 | 10/1998 | (JP) . |
| WO 99/36971 | 7/1999 | (WO) . |
| WO 00/72392 A1 | 11/2000 | (WO) . |

OTHER PUBLICATIONS

International Search Report PCT/US 00/30270, Feb., 2001.

* cited by examiner

Primary Examiner—John S. Maples
(74) Attorney, Agent, or Firm—Harness, Dickey & Pierce, P.L.C.

(57) ABSTRACT

The invention provides a battery cell including an electrode having an area defined by a perimeter including an edge, a counter electrode having an area defined by a perimeter including an edge, and a separator having an area defined by a perimeter including an edge. The separator is sandwiched between the electrode and the counter electrode in a layered relationship with at least portions of the edges being contiguous. The separator and one of the electrode and the counter electrode each include a first notch in the edge exposing a portion of the other of the electrode and counter electrode. The separator and the other of the electrode and the counter electrode each include a second notch in the edge exposing a portion of the one of the electrode and the counter electrode.

28 Claims, 6 Drawing Sheets

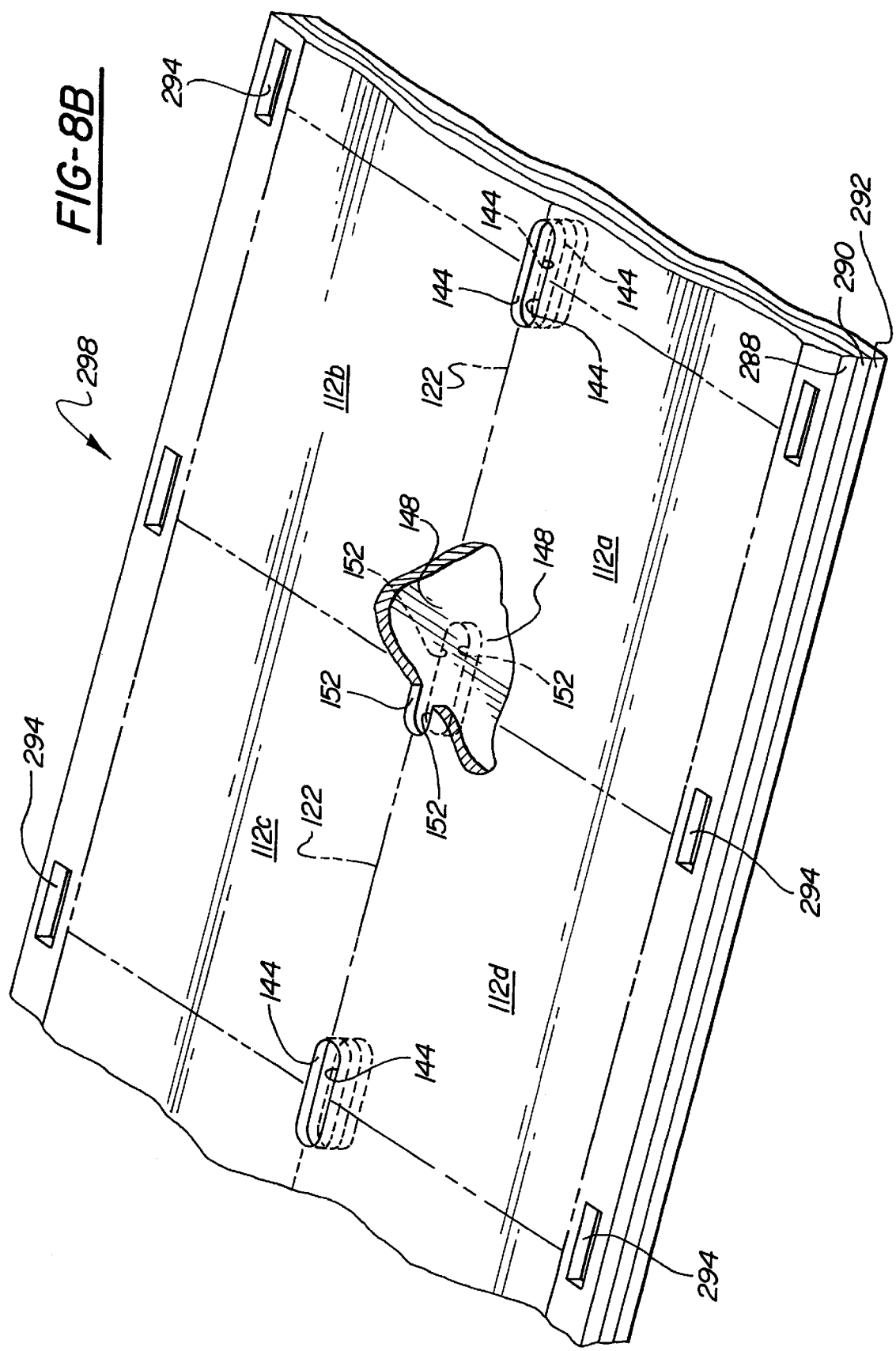

BATTERY CELL HAVING NOTCHED LAYERS

FIELD OF THE INVENTION

This invention relates to a battery cell and a method for producing the same.

BACKGROUND OF THE INVENTION

A battery cell typically includes a separator material sandwiched between two oppositely-charged electrodes. The oppositely-charged electrodes are generically referred to as an electrode and a counter electrode. The term electrode identifies either a positive (cathodic) electrode or a negative (anodic) electrode and the term counter electrode identifies the other electrode.

A battery bi-cell typically includes at least three electrodes layered in an electrode/counter electrode/electrode or counter electrode/electrode/counter electrode relationship. Separator material can be included in the electrode and/or counter electrode of the bi-cell.

Polymer film batteries are commonly constructed from one or more cells or bi-cells. The bi-cells are normally arranged in a stack and enclosed in a battery package. A positive terminal strip and negative terminal strip extend outward from the package. Each bi-cell typically includes at least one electrode tab and at least one counter electrode tab connecting the bi-cell to each respective battery terminal strip. In this manner, the electrode and counter electrode tabs provide a circuit for charging and discharging the battery. In most applications, it is desirable to encase the battery in the smallest possible package. As a result, gathering the electrode and counter electrode tabs from each bi-cell and routing such tabs to the respective battery terminal strips within a small battery package presents difficulties.

Conventional electrode tab designs used in parallel plate cell constructions have several shortcomings. Such tab designs produce a bi-cell having loose internal component tolerances, inefficient volumetric utilization of the battery package geometry, and a fragile mechanical structure.

Further, conventional bi-cell manufacturing methods also have several shortcomings. Such bi-cell fabrication methods are complex, wasteful of material, and require a large number of tolerancing and alignment steps. Accordingly, it would be desirable to provide a cell design and method of producing the same which overcomes the shortcomings of the prior art.

SUMMARY OF THE INVENTION

The present invention provides a battery cell including an electrode having an area defined by a perimeter including an edge, a counter electrode having an area defined by a perimeter including an edge, and a separator having an area defined by a perimeter including an edge. The separator is sandwiched between the electrode and the counter electrode in a layered relationship with at least portions of the edges being contiguous. The separator and one of the electrode and the counter electrode each include a first notch in the edge exposing a portion of the other of the electrode and counter electrode.

The separator and the other of the electrode and the counter electrode each include a second notch in the edge exposing a portion of the one of the electrode and the counter electrode.

A method of producing a battery cell in accordance with the present invention is also provided. The cell includes a plurality of film layers, a plurality of current collector layers, and at least one separator layer. Each current collector layer includes a predetermined lead portion. The method includes the steps of: providing at least one notch in each layer, and stacking the layers with the notches arranged with one another to expose the predetermined lead portion of each current collector layer.

These and other objects, features, and advantages will become apparent from the following description of the preferred embodiments, claims, and accompanying drawings.

BRIEF DESCRIPTION OF THE DRAWINGS

FIG. 8B shows the fragmented strips of film and current collector layered upon each other to illustrate a method of producing a portion of the bi-cell of FIG. 6.

DESCRIPTION OF THE PREFERRED EMBODIMENTS

Figure 1:
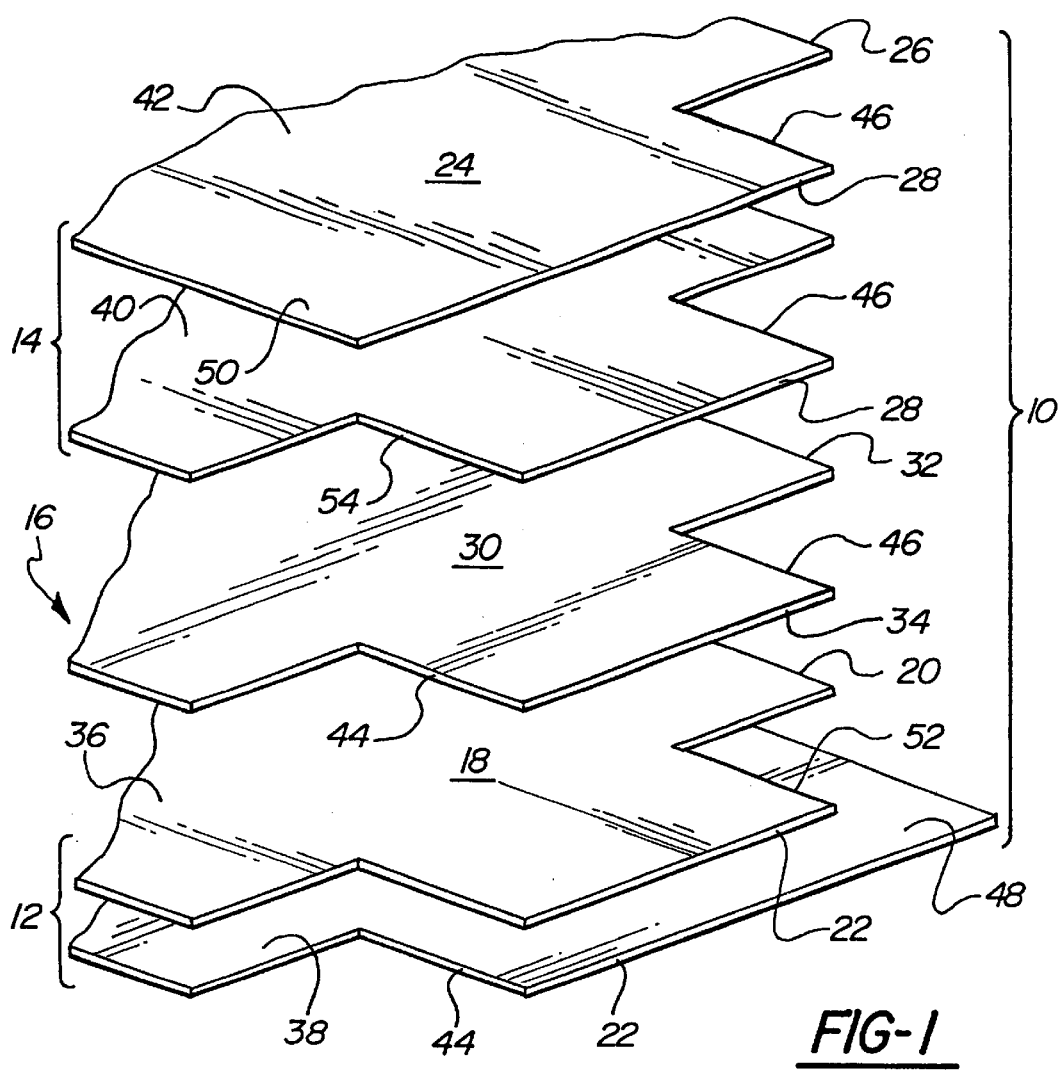
FIG. 1 is an exploded, perspective view of a cell, in accordance with the present invention, having a layered electrode/separator/counter electrode structure.

Referring to the Figures, wherein like numerals indicate like or corresponding parts throughout the several views, FIG. 1 shows an exploded, perspective view of a cell 10 in accordance with the present invention. The cell 10 includes an electrode 12, a counter electrode 14, and a separator 16. The electrode 12 has an area, generally indicated by reference numeral 18, defined by a perimeter 20 including an edge or sidewall 22. The counter electrode 14 has an area, generally indicated by reference numeral 24, defined by a perimeter 26 including an edge or sidewall 28. The separator 16 has an area, generally indicated by reference numeral 30, defined by a perimeter 32 including an edge or sidewall 34.

The electrode 12 includes a film layer 36 and a current collector or grid layer 38. The counter electrode 14 includes a film layer 40 and a current collector or grid layer 42. The electrode film layer 36, the electrode current collector layer 38, and the separator 16 each include a first notch 44. The counter electrode film layer 40, the counter electrode current collector layer 42, and the separator 16 each include a second notch 46. The first notch 44 is disposed in the edge 22 of the electrode 12 and the edge 34 of the separator 16. The second notch 46 is disposed in the edge 28 of the counter electrode 14 and the edge 34 of the separator 16.

Preferably, the perimeter 20 of the electrode 12 includes a corner portion 48, defined in part by the edge 22, which is exposed by the second notches 46 in the counter electrode 14 and the separator 16. The electrode corner portion 48 is a part of the electrode current collector layer 38. Preferably, the perimeter 26 of the counter electrode 14 includes a corner portion 50, defined in part by the edge 28, which is exposed by the first notches 44 in the electrode 12 and the separator 16. The counter electrode corner portion 50 is a part of the counter electrode current collector layer 42. The electrode film layer 36 includes a third notch 52 exposing the electrode corner portion 48. The counter electrode film layer 40 includes a fourth notch 54 exposing the counter electrode corner portion 50.

In keeping with the present invention, the notches 44, 46, 52, and/or 54 may be disposed in a middle or center of an edge of one layer to expose a middle or center edge portion of another layer.

Typically, the thickness of the cell 10 including the electrode 12, the separator 16, and the counter electrode 14 is approximately 0.5 millimeters. Accordingly, the electrode 12, the counter electrode 14, and the separator 16 shown in FIG. 1 have been enlarged for illustrative purposes.

Figure 2:
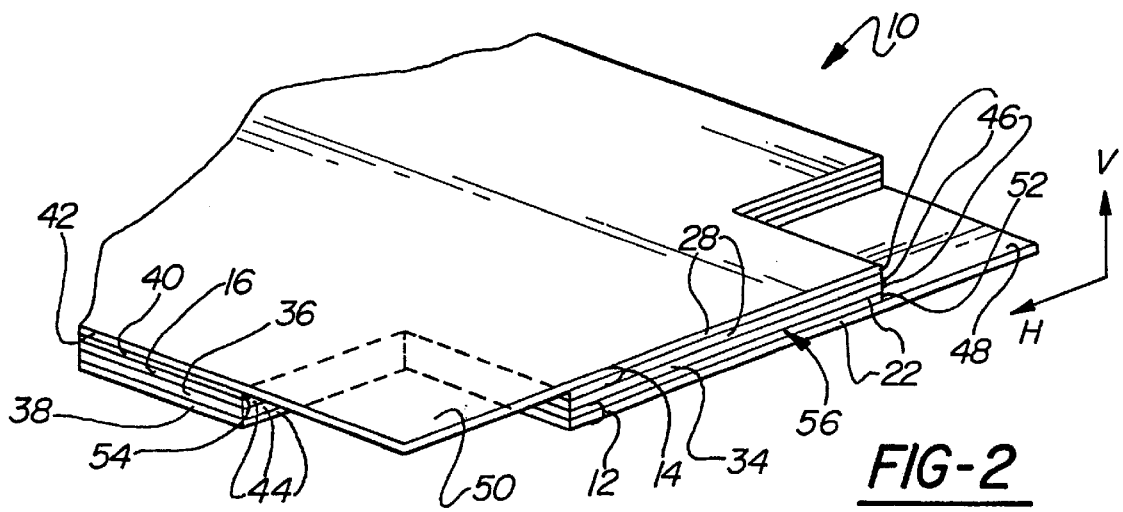
FIG. 2 is a perspective view of the cell of FIG. 1 assembled in accordance with the present invention.

FIG. 2 is a perspective view of the cell 10 assembled in accordance with the present invention. The separator 16 is sandwiched between the electrode 12 and the counter electrode 14 in a layered relationship with at least portions of the edges 22, 28, and 34 being contiguous. The contiguous area is generally indicated by reference numeral 56. In other words, the edges 22, 28, and 34, of the electrode 12, the counter electrode 14, and the separator 16 respectively, overlie/underlie each other in relation to the horizontal axis H of FIG. 2.

In FIG. 2, the edges 22, 28, and 34, of the electrode 12, the counter electrode 14, and the separator 16 respectively, form a generally or substantially flush surface in relation to the vertical axis V. However, the edges 22, 28, and 34 may overhang/underhang each other in relation to the vertical axis V of FIG. 2 without departing from the scope and spirit of the present invention.

The present invention provides a cell 10 having electrode, counter electrode, and separator layers which are notched to expose an overlying or underlying surface. In the layered arrangement, the first notches 44 in the electrode film layer 36, the electrode current collector layer 38, and the separator 16 and the fourth notch 54 in the counter electrode film layer 40 align to expose the corner portion 50 of the overlying counter electrode current collector layer 42. The second notches 46 in the counter electrode film layer 40, the counter electrode current collector layer 42, and the separator 16 and the third notch 52 in the electrode film layer 36 align to expose the corner portion 48 of the underlying electrode current collector layer 38.

Although the electrode 12 and the counter electrode 14 shown in FIGS. 1 and 2 have a fragmented polygonal shape, one of ordinary skill in the art will appreciate that the electrode 12 and counter electrode 14 can take any shape having an edge without departing from the scope of the present invention.

The electrode 12 may be a positively-charged electrode, by definition making the counter electrode 14 a negatively-charged electrode, or the electrode 12 may be a negatively-charged electrode, by definition making the counter electrode 14 a positively-charged electrode.

Figure 3:
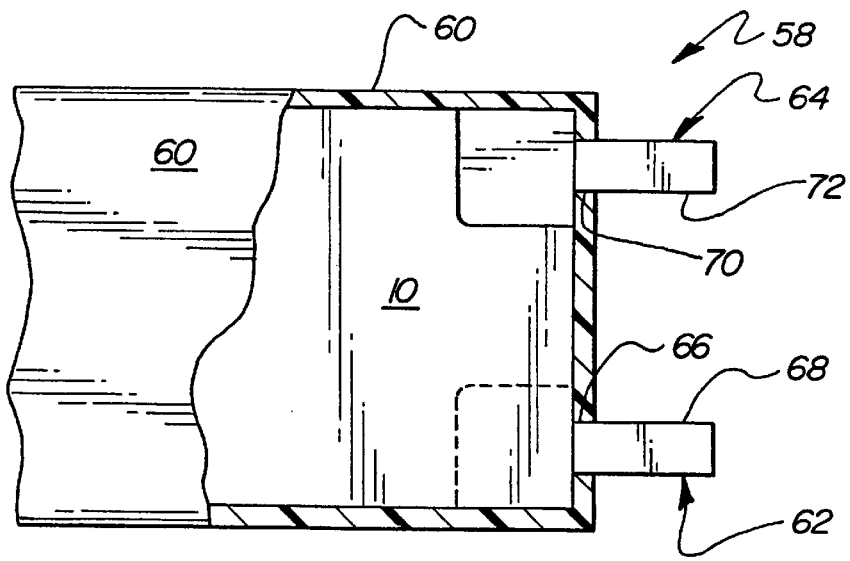
FIG. 3 is a partially removed top view of a battery comprised of a plurality of cells in accordance with the present invention.

FIG. 3 is a partially removed top view of a battery 58 comprised of a plurality of cells 10 in accordance with the present invention. The components shown in FIG. 3 have been enlarged for illustrative purposes. The battery 58 includes a package 60 for housing or encasing the plurality of cells 10. In FIG. 3, a portion of the top of the package 60 has been removed to show the top surface of the cells 10, a first battery terminal strip 62, and a second battery terminal strip 64. The first battery terminal strip 62 includes a first portion 66 disposed inside the package 60 and a second portion 68 disposed outside the package 60. The second battery terminal strip 64 includes a first portion 70 disposed inside the package 60 and a second portion 72 disposed outside the package 60.

Figure 4:
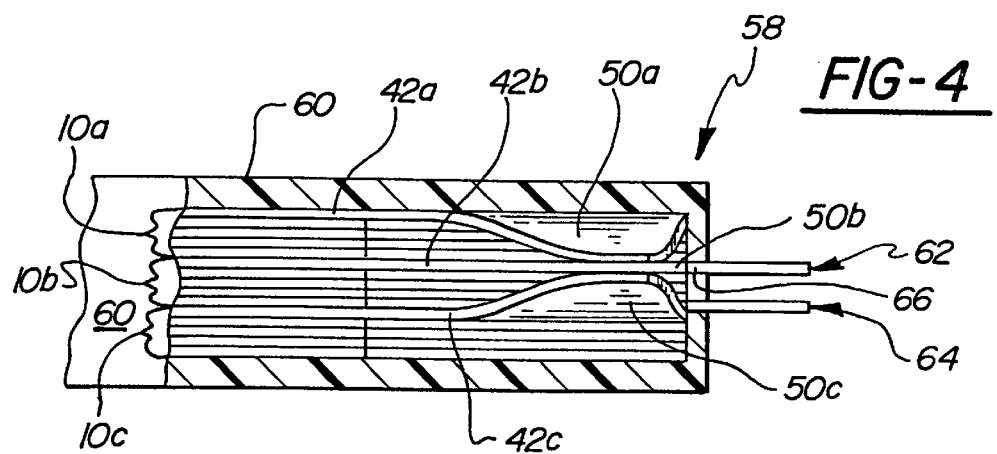
FIG. 4 is a partially removed side view of the battery of FIG. 3.

FIG. 4 is a partially removed side view of the battery 58 of FIG. 3 with a portion of the side of the package 60 removed to show three cells 10a, 10b, 10c in a layered or stacked relationship. The components shown in FIG. 4 have been enlarged for illustrative purposes. Each cell 10a, 10b, 10c includes a counter electrode current collector layer, a counter electrode film layer, a separator, an electrode film layer, and an electrode current collector layer as previously described. For clarity purposes, only the counter electrode current collector layers 42a, 42b, 42c of the cells 10a, 10b, 10c respectively have been labeled in FIG. 4. Typically, the cells 10a, 10b, 10c are held, fastened, or secured to one another in the layered relationship with a ultrasonic weld or other attachment means known in the art.

In accordance with the present invention, the first portion 66 of the first battery terminal strip 62 is in electrical communication with the exposed portion of each counter electrode current collector layer 42a, 42b, 42c. Preferably, the exposed corner portions 50a, 50c of the outer counter electrode current collector layers 42a, 42c respectively are bent to contact the exposed corner portion 50b of the middle counter electrode current collector layer 42b and/or the first portion 66 of the first battery terminal strip 62.

Figure 5:
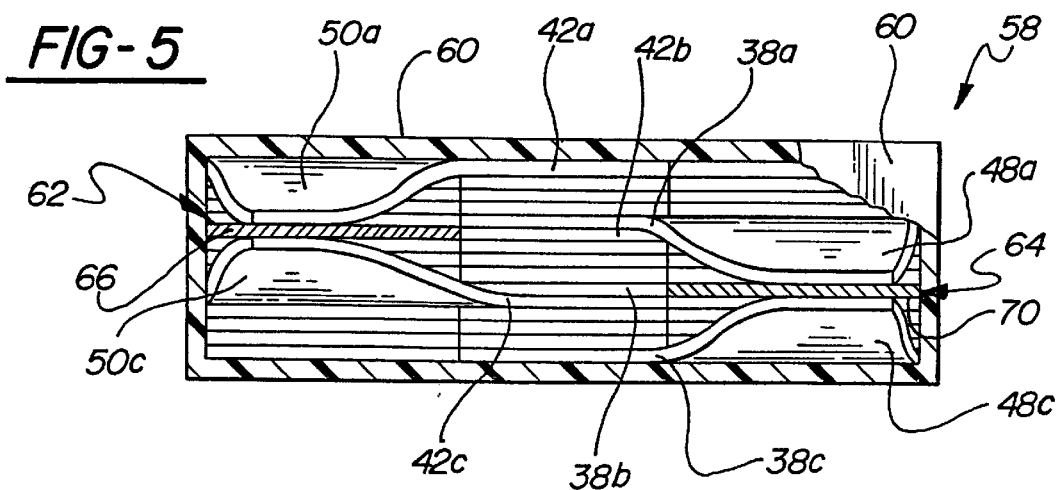
FIG. 5 is a partially removed front view of the battery of FIG. 3.

FIG. 5 is a partially removed front view of the battery 58 of FIG. 3 with a portion of the front of the package 60 and the second portion 68 and 72 of the first and second battery terminal strips 62 and 64 respectively removed. The components shown in FIG. 5 have been enlarged for illustrative purposes. In accordance with the present invention, the first portion 70 of the second battery terminal strip 64 is in electrical communication with the exposed portion of each electrode current collector layer 38a, 38b, 38c. Preferably, the corner portion 48a, 48c of the outer electrode current collector layers 38a, 38c respectively are bent to contact the exposed corner portion of the middle electrode current collector layer 38b (hidden behind the second battery terminal strip 64 in FIG. 5) and/or the first portion 70 of the second battery terminal strip 64. In this manner, each counter electrode is electrically connected to the first battery terminal strip 62 and each electrode is electrically connected to the second battery terminal strip 64 within a cubic-shaped area defined by or surrounding the stacked cells 10a, 10b, 10c. As a result, the cells 10a, 10b, 10c may be housed or enclosed in a package 60 smaller than that which is required for cells or bi-cells having known electrode tabs.

Alternatively, the corner portions 48a, 48b, 48c, and 50a, 50b, 50c may be bent to contact or meet at a location adjacent to either of the outer current collector layers 38a or 38c and 42a or 42c respectively.

The cell 10 has a layered electrode/separator/counter electrode structure. However, a bi-cell in accordance with the present invention may include a variety of other layered arrangements including, but not limited to, a layered counter electrode/electrode/counter electrode structure.

Figure 6:
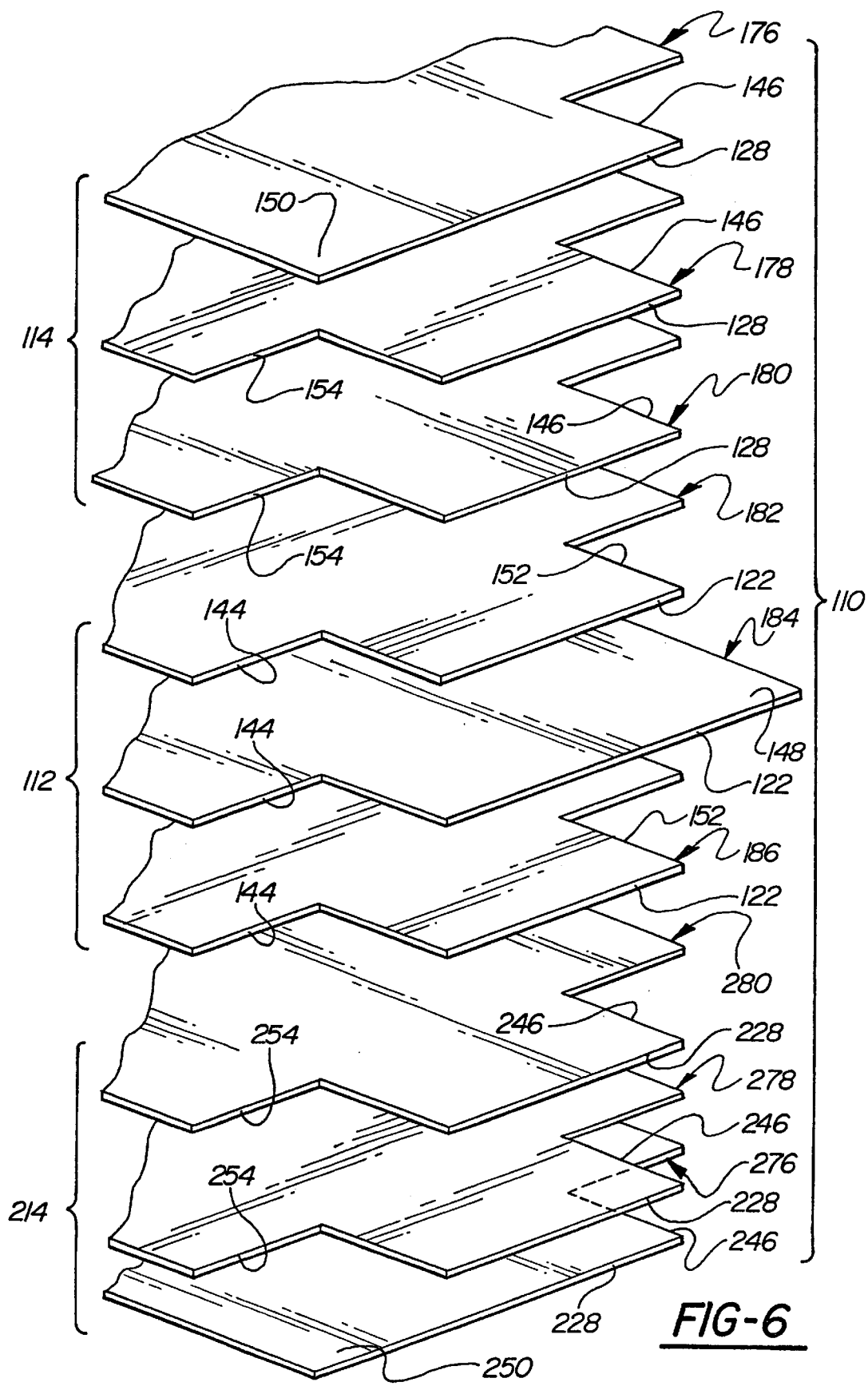
FIG. 6 is an exploded, perspective view of a bi-cell, in accordance with the present invention, having a layered counter electrode/electrode/counter electrode structure.

FIG. 6 is an exploded, perspective view of a bi-cell 110 in accordance with the present invention. The bi-cell 110 includes a first counter electrode 114, an electrode 112, and a second counter electrode 214.

The first counter electrode 114 includes a current collector or grid layer 176, a film layer 178, and a separator layer 180. Each layer 176, 178, and 180 includes an edge 128 having a second notch 146. The current collector layer 176 further includes a corner portion 150. The film layer 178 and the separator layer 180 each include a fourth notch 154 exposing the corner portion 150.

The electrode 112 includes a first film layer 182, a current collector or grid layer 184, and a second film layer 186. Each layer 182, 184, and 186 includes an edge 122 having a first notch 144. The current collector layer 184 further includes a corner portion 148. The first and second film layers 182 and 186 each include a third notch 152 exposing the corner portion 148.

The second counter electrode 214 includes a separator layer 280, a film layer 278, and a current collector or grid layer 276. Each layer 280, 278, and 276 includes an edge 228 having a second notch 246. The current collector layer 276 further includes a corner portion 250. The film layer 278 and the separator layer 280 each include a fourth notch 254 exposing the corner portion 250.

One of ordinary skill in the art will appreciate that the order of the electrode and counter electrode layers (i.e. the film layer, the current collector layer, and the separator layer) may differ without departing from the scope of the present invention. The number of layers comprising the electrode and the counter electrodes may also vary without departing from the scope of the present invention. A separator layer may be viewed as an individual layer as shown in FIG. 1, or as part of an electrode or counter electrode as shown in FIG. 6.

Figure 7:
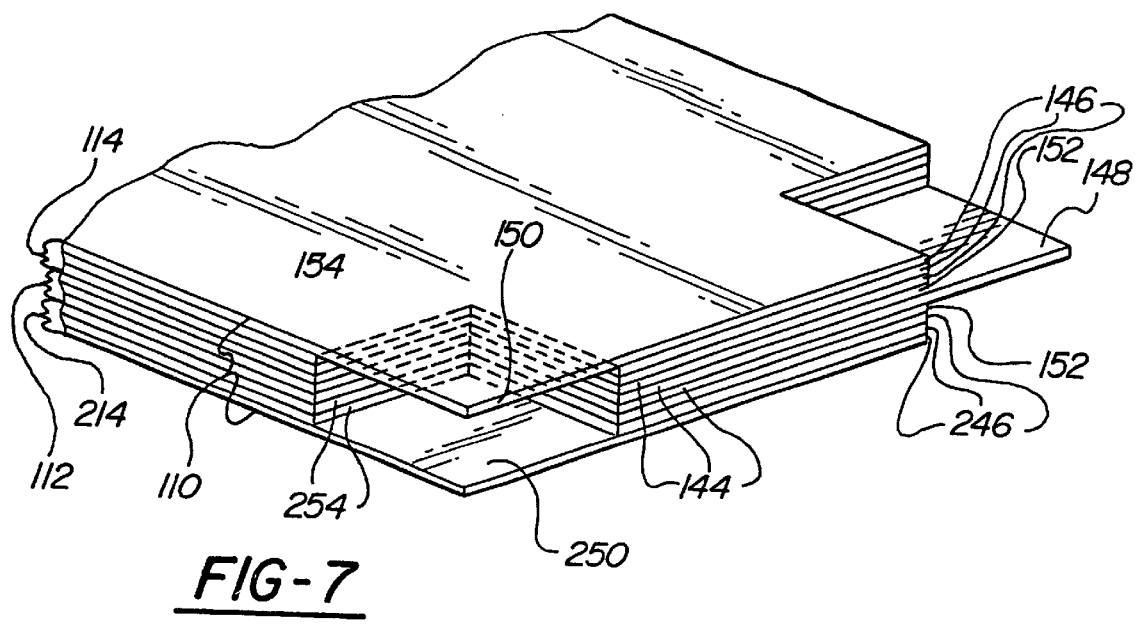
FIG. 7 is a perspective view of the bi-cell of FIG. 6 assembled in accordance with the present invention.

FIG. 7 is a perspective view of the bi-cell 110 assembled in accordance with the present invention. The bi-cell 110 is assembled in a first counter electrode/ electrode/second counter electrode layered relationship. The first notches 144 in the electrode 112 and the fourth notches 154 and 254 in the first and second counter electrodes 114 and 214 respectively align to expose the corner portions 150 and 250 of the first and second counter electrodes 114 and 214 respectively. The second notches 146 and 246 in the first and second counter electrodes 114 and 214 respectively and the third notches 152 in the electrode 112 align to expose the corner portion 148 of the electrode 112.

In accordance with the present invention, a plurality of the bi-cells 110 may be stacked and encased in a package to form a battery as previously described for the aforementioned cell 10. In keeping with the spirit of the present invention, the corner portions 148 and 150 of the bi-cell 110 may be bent in the manner previously described for the cell 10. The inventive notches may be used in a variety of bi-cell structures.

The location and shape of the notches should be selected to best facilitate the connection of the exposed portions of each electrode and counter electrode to the battery terminal strips. The shape of the notches may be of any geometry with straight, convex, or concave edges.

In the aforementioned bi-cell 110 there are three different types of notches. The three types of notches include (1) a notch in a current collector layer, hereinafter referred to as a current collector notch, (2) a notch in a film layer, hereinafter referred to as a film notch, and (3) a notch in a separator layer, hereinafter referred to as a separator notches.

The size of one type of notch may differ from the size of another type of notch. The size of a particular type of notch should be selected in light of mechanical, electrical, and/or electrochemical considerations. For example, in the aforementioned bi-cell 110, current collector notches are preferably larger than film notches, and film notches are preferably larger than separator notches. In other words, film notches preferably overhang or extend outwardly from the bi-cell 110 beyond current collector notches, and separator notches preferably overhang or extend outwardly from the bi-cell 110 beyond film notches.

A method of producing a cell or bi-cell in accordance with the present invention is also provided. The cell or bi-cell includes a plurality of film layers, a plurality of current collector layers, and at least one separator layer. These layers are stacked to form the electrode/separator/counter electrode cell arrangement or the counter electrode/electrode/counter electrode bi-cell arrangement previously described. Each current collector layer includes a predetermined lead portion previously referred to as a corner portion. The lead portions are used to electrically connect the cell or bi-cell to first and second battery terminal strips.

The method includes the steps of: providing at least one notch in each layer, and stacking the layers with the notches arranged with one another to expose the predetermined lead portion of each current collector layer. Preferably, the notches are punched in each layer with a punch tool. Once stacked and aligned, the layers are laminated.

In an alternative method, the step of stacking the layers further includes the steps of: providing alignment slots in each layer, and stacking the layers with the alignment slots arranged with one another. After the layers are stacked and aligned, the alignment slots are preferably removed by slitting or cutting the alignment slots from each layer.

In a preferred method, the step of providing at least one notch further includes the steps of: providing continuous strips of film, separator, and current collector; providing at least one aperture in each strip; and slitting each strip through the aperture to produce a plurality of identically shaped layers. Preferably, the apertures are punched in each strip with a punch tool.

Figure 8A:
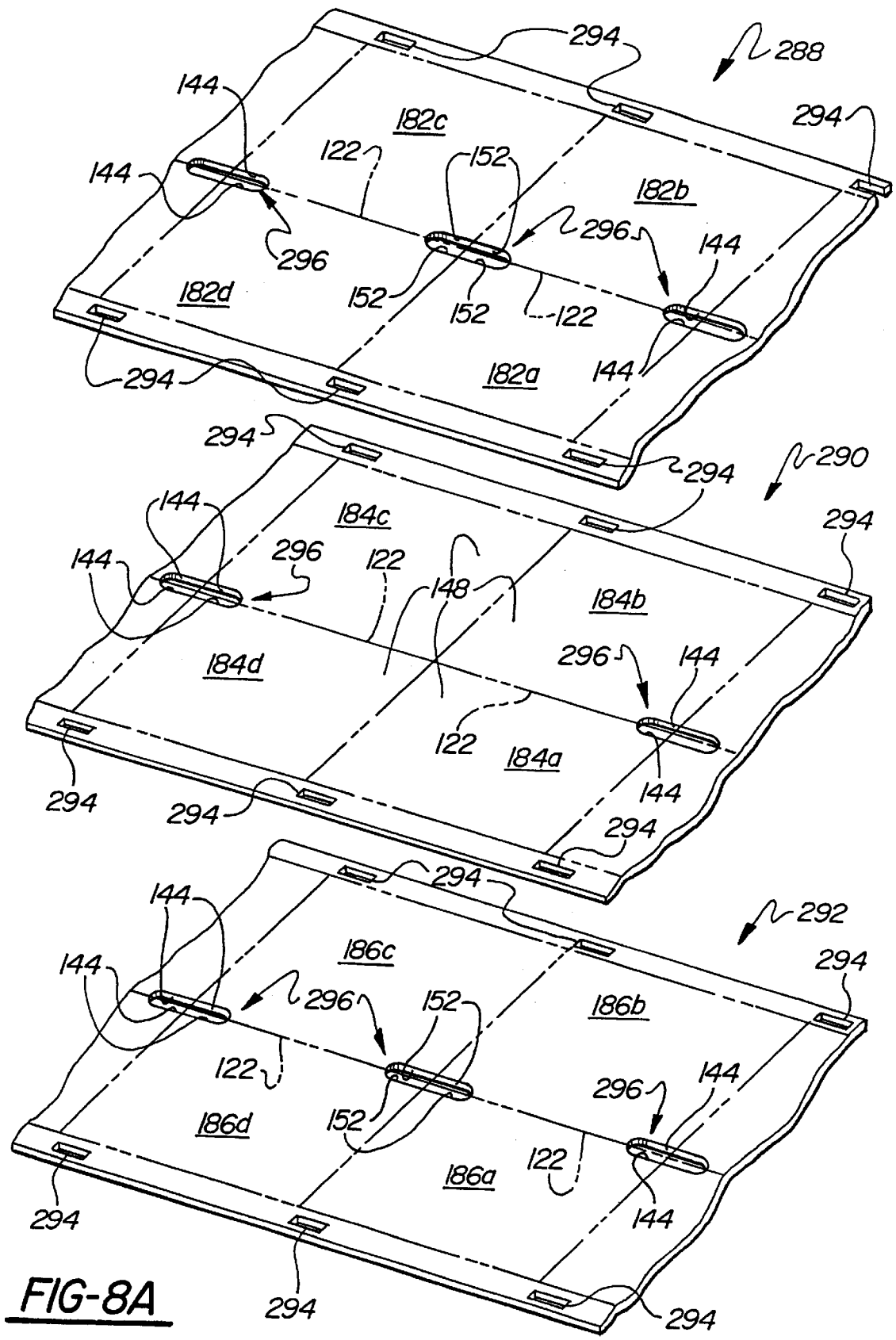
FIG. 8A shows a fragmented portion of a continuous first strip of film, a fragmented portion of a continuous strip of current collector, and a fragmented portion of a continuous second strip of film.

For exemplary purposes and to better understand the method steps, the method will be described to produce the electrode 112 shown in FIG. 6. FIG. 8A shows a fragmented portion of a continuous first strip of film 288, a fragmented portion of a continuous strip of current collector 290, and a fragmented portion of a continuous second strip of film 292 which may be stacked and slit to produce the electrode 112. Alternatively, the strips 288, 290, and 292 may be slit into layers and such layers stacked to produce the electrode 112.

Each strip 288, 290, and 292 includes alignment slots 294 and at least one aperture 296. For illustrative purposes, each strip 288, 290, and 292 has been marked with phantom slit lines which indicate where each strip 288, 290, and 292 will be slit. The first strip of film 288 has been marked with phantom slit lines which bisect the strip of film 288 through the apertures 296 to produce four identically shaped film layers 182a, 182b, 182c, 182d. After the first strip of film 288 is slit along the phantom slit lines, each film layer 182a, 182b, 182c, 182d will include a first notch 144, an edge 122, and a third notch 152 similar to the first film layer 182 of the electrode 112 shown in FIG. 6.

The strip of current collector 290 has been marked with phantom slit lines which bisect the strip of current collector 290 through the aperture 296 to produce four identically shaped current collector layers 184a, 184b, 184c, 184d.

After the strip of current collector 290 is slit along the phantom slit lines, each current collector layer 184a, 184b, 184c, 184d will include a first notch 144, an edge 122, and a corner portion 148 similar to the current collector layer 184 of the electrode 112 shown in FIG. 6.

The second strip of film 292 has been marked with phantom slit lines which bisect the strip of film 292 through the apertures 296 to produce four identically shaped film layers 186a, 186b, 186c, 186d. After the second strip of film 292 is slit along the phantom slit lines, each film layer 186a, 186b, 186c, 186d will include a first notch 144, an edge 122, and a third notch 152 similar to the second film layer 186 of the electrode 112 shown in FIG. 6.

FIG. 8B shows a stack 298 of the fragmented strips 288, 290, and 292 layered upon each other in a first film/current collector/second film relationship. For illustrative purposes, the stack 298 has been marked with phantom slit lines. The phantom slit lines identify four identically shaped electrodes 112a, 112b, 112c, 112d comprised of a first film layer 182a, 182b, 182c, 182d, a current collector layer 184a, 184b, 184c, 184d, and a second film layer 186a, 186b, 186c, 186d respectively.

A portion of the first strip of film 288 has been broken away to show how the third notches 152 in the first and second strips of film 288 and 292 align to expose the corner portion 148 of the strip of current collector 290 within each electrode 112a, 112b, 112c, 112d. The first notch 144 in the first strip of film 288, the strip of current collector 290, and the second strip of film 290 align to expose the corner portion of a counter electrode, not shown.

Although the strips of film and current collector 288, 290, 292 are illustrated in FIGS. 8A and 8B having a two electrode width, the strips of film and current collector 288, 290, 292 may be one electrode, two electrodes, four electrodes, or six electrodes, etc. wide.

One of ordinary skill in the art will recognize that this exemplary process may be repeated to produce a plurality of electrodes and counter electrodes which may be stacked to produce a cell or bi-cell in accordance with the present invention.

One of ordinary skill in the art will recognize that the claimed method may be used to produce a plurality of cells or bi-cells which may be stacked and encased in a package and connected to first and second battery terminal strips to form a battery as previously described.

Figure 9:
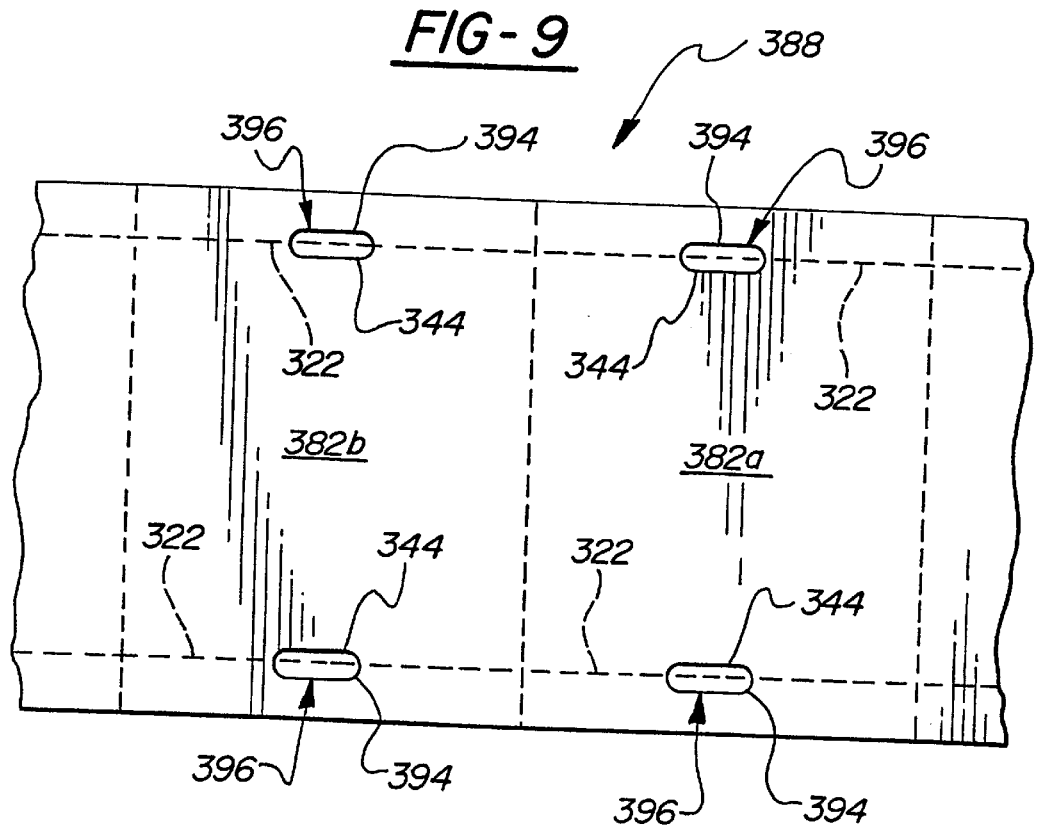
FIG. 9 shows a fragmented portion of a continuous strip of material having an alternative notch location.

FIG. 9 shows a fragmented portion of a continuous strip of material 388 having an alternative notch location. The material may be film, separator, or current collector. For illustrative purposes, the strip of material 388 has been marked with phantom slit lines which indicate where the strip 388 will be slit. The strip of material 388 includes apertures 396 which function initially as alignment slots 394 and, after the strip 388 is slit, as notches 344. The phantom slit lines bisect the strip of material 388 through the apertures 396 to produce two identically shaped material layers 382a and 382b. Although the strip of material 388 is illustrated in FIG. 9 having a one electrode width, the strip 388 may be one electrode, two electrodes, four electrodes, or six electrodes, etc. wide and still incorporate the alternative notch location.

After the strip of material 388 is slit along the phantom slit lines, each material layer 382a and 382b will include a notch 344 disposed in the middle or center of an edge 322. One of ordinary skill in the art will recognize that a first layer of material having a middle edge notch 344 can be aligned to expose a middle edge portion of an adjacent second layer of material in much the same manner as a first layer of material having a corner notch can be aligned to expose a corner portion of an adjacent second layer of material as described above.

One of ordinary skill in the art will recognize that the alternative notch location can be incorporated into the aforementioned cell 10 and bi-cell 110 designs. One of ordinary skill in the art will also recognize that the aforementioned method can be used to produce a cell having the alternative notch location.

What is claimed is:

1. A battery cell, comprising:
   an electrode having an area defined by a perimeter including an edge;
   a counter electrode having an area defined by a perimeter including an edge; and
   a separator having an area defined by a perimeter including an edge;
   said separator sandwiched between said electrode and said counter electrode in a layered relationship with at least portions of said edges being contiguous;
   said separator and one of said electrode and said counter electrode each including a first notch in said edge exposing a portion of the other of said electrode and said counter electrode.

2. The battery cell of claim 1, wherein said separator and the other of said electrode and said counter electrode each include a second notch in said edge exposing a portion of said one of said electrode and said counter electrode.

3. The battery cell of claim 2, wherein said one of said electrode and said counter electrode is said electrode, and the other of said electrode and said counter electrode is said counter electrode.

4. The battery cell of claim 3, wherein said perimeter of said electrode includes a corner portion defined by said edge and said second notches.

5. The battery cell of claim 4, wherein said electrode includes a film layer and a current collector layer with said current collector layer including said electrode corner portion and said film layer including a third notch exposing said electrode corner portion.

6. The battery cell of claim 5, wherein said perimeter of said counter electrode includes a corner portion defined by said edge and said first notches.

7. The battery cell of claim 6, wherein said counter electrode includes a film layer and a current collector layer with said current collector layer including said counter electrode corner portion and said film layer including a fourth notch exposing said counter electrode corner portion.

8. The battery cell of claim 7, wherein said counter electrode includes said separator with said counter electrode film layer sandwiched between said counter electrode current collector layer and said separator in a layered relationship.

9. The battery cell of claim 8, including an another counter electrode with said another counter electrode stacked in a counter electrode/electrode/another counter electrode layered relationship.

10. The battery cell of claim 9, wherein said electrode further includes an another film layer having an edge including a first notch and a third notch with said electrode current collector layer sandwiched between said electrode film layer and said another film layer.

11. The battery cell of claim 10, wherein said separator of said counter electrode is layered adjacent to said electrode film layer, and said separator of said another counter electrode is layered adjacent to said electrode another film layer.

12. A battery, comprising:

a plurality of cells stacked in relation to each other, each cell including an electrode having an area defined by a perimeter including an edge, a counter electrode having an area defined by a perimeter including an edge, and a separator having an area defined by a perimeter including an edge, said separator sandwiched between said electrode and said counter electrode in a layered relationship with at least portions of said edges being contiguous, said separator and one of said electrode and said counter electrode each including a first notch in said edge exposing a portion of the other of said electrode and said counter electrode.

13. The battery of claim 12, including a package encasing said plurality of cells.

14. The battery of claim 13, including a first battery terminal strip having a first portion disposed inside said package and a second portion disposed outside said package with said first portion of said first battery terminal strip in electrical communication with said exposed portion of the other of said electrode and said counter electrode of each cell.

15. The battery of claim 14, wherein said separator and the other of said electrode and said counter electrode each include a second notch in said edge exposing a portion of said one of said electrode and said counter electrode.

16. The battery of claim 15, including a second battery terminal strip having a first portion disposed inside said package and a second portion disposed outside said package with said first portion of said second battery terminal strip in electrical communication with said exposed portion of said one of said electrode and counter electrode of each cell.

17. The battery of claim 16, wherein said one of said electrode and said counter electrode is said electrode, and the other of said electrode and said counter electrode is said counter electrode.

18. The battery of claim 17, wherein said perimeter of said electrode includes a corner portion defined by said edge and said second notches.

19. The battery of claim 18, wherein said electrode includes a film layer and a current collector layer with said current collector layer including said electrode corner portion and said film layer including a third notch exposing said electrode corner portion.

20. The battery of claim 19, wherein said electrode corner portion of each cell is bent to contact said first portion of said second battery terminal strip.

21. The battery of claim 20, wherein said perimeter of said counter electrode includes a corner portion defined by said edge and said first notches.

22. The battery of claim 21, wherein said counter electrode includes a film layer and a current collector layer with said current collector layer including said counter electrode corner portion and said film layer including a fourth notch exposing said counter electrode corner portion.

23. The battery of claim 22, wherein said counter electrode corner portion of each cell is bent to contact said first portion of said first battery terminal strip.

24. The battery of claim 23, wherein said counter electrode includes said separator with said counter electrode film layer sandwiched between said counter electrode current collector layer and said separator in a layered relationship.

25. The battery of claim 24, wherein each cell includes an another counter electrode with said another counter electrode stacked in a counter electrode/electrode/another counter electrode layered relationship.

26. The battery of claim 25, wherein said electrode further includes an another film layer having an edge including a first notch and a third notch with said electrode current collector layer sandwiched between said electrode film layer and said another film layer.

27. The battery of claim 26, wherein said separator of said counter electrode is layered adjacent to said electrode film layer, and said separator of said another counter electrode is layered adjacent to said electrode another film layer.

28. The battery of claim 27, wherein said corner portion of said counter electrode and said another counter electrode of each cell is bent to contact said first portion of said first battery terminal strip.

* * * * *